United States Patent [19]

Yamamoto

[11] Patent Number: 4,546,394
[45] Date of Patent: Oct. 8, 1985

[54] SIGNAL RECONSTRUCTION CIRCUIT FOR DIGITAL SIGNALS

[75] Inventor: Takaaki Yamamoto, Tokyo, Japan

[73] Assignee: Sansui Electric Co., Ltd., Tokyo, Japan

[21] Appl. No.: 461,306

[22] Filed: Jan. 26, 1983

[30] Foreign Application Priority Data

Jan. 29, 1982 [JP] Japan .................................. 57-13109
Jan. 19, 1983 [JP] Japan .................................. 58-7085

[51] Int. Cl.⁴ .............................................. G11B 5/09
[52] U.S. Cl. ...................................... 360/53; 328/164
[58] Field of Search ...................... 307/268, 359, 261; 328/151, 164; 365/78; 360/53

[56] References Cited

U.S. PATENT DOCUMENTS

| | | | |
|---|---|---|---|
| 3,840,892 | 10/1974 | Hayashi | 360/53 |
| 3,862,440 | 1/1975 | Suzuki et al. | 307/268 X |
| 4,241,311 | 12/1980 | Massey | 328/151 X |
| 4,449,061 | 5/1984 | Yasuda et al. | 328/164 X |

FOREIGN PATENT DOCUMENTS

| | | | |
|---|---|---|---|
| 0047955 | 3/1982 | European Pat. Off. | 307/603 |
| 0063443 | 10/1982 | European Pat. Off. | 307/268 |
| 0131324 | 6/1978 | German Democratic Rep. | 307/359 |
| 0040067 | 3/1979 | Japan | 307/268 |

Primary Examiner—Eugene R. LaRoche
Assistant Examiner—Robert J. Pascal
Attorney, Agent, or Firm—Sughrue, Mion, Zinn, Macpeak, and Seas

[57] ABSTRACT

A digital signal reconstruction circuit includes a reproduction means for reading a digital data signal recorded on a recording medium, signal derivation means for deriving a plurality of shifted signals produced by sequentially shifting the read digital data, arithmetic means, comprising a logical sum circuit and a logical product circuit, for processing the output from the signal derivation means, selector means for selecting either the output from the logical sum circuit or the logical product circuit and latch means receiving the output of the selection means, the output of the latch means being fed back to the selector means to control the selection of either the logic sum circuit or the logic product circuit in accordance with the logic level of the latch means output.

7 Claims, 5 Drawing Figures

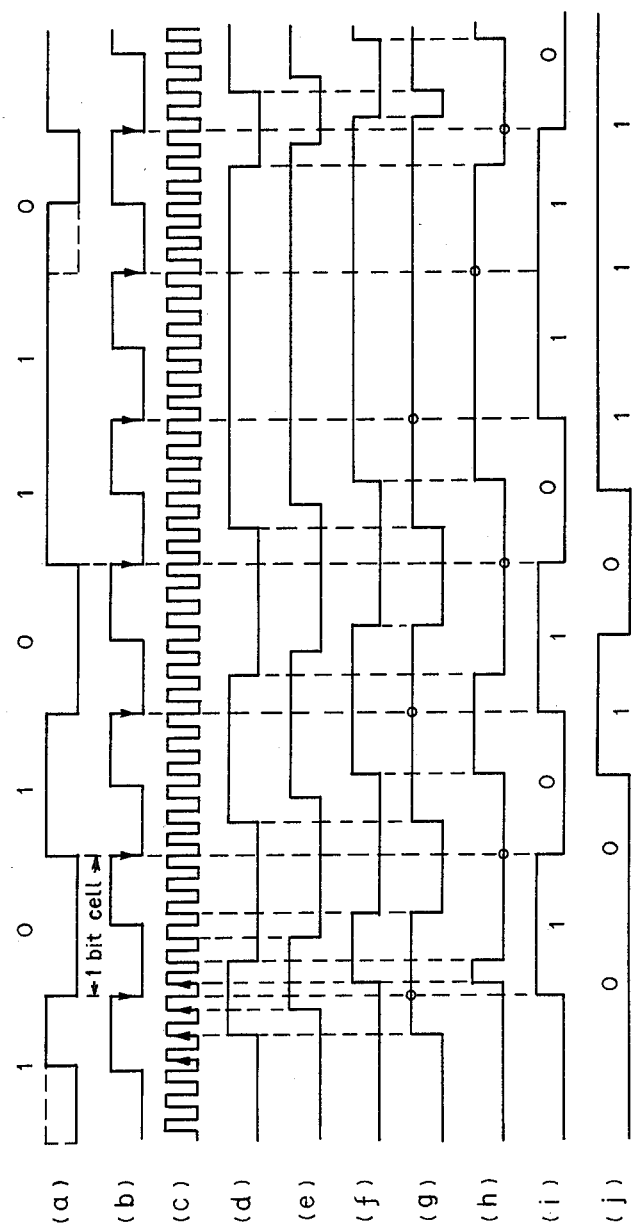

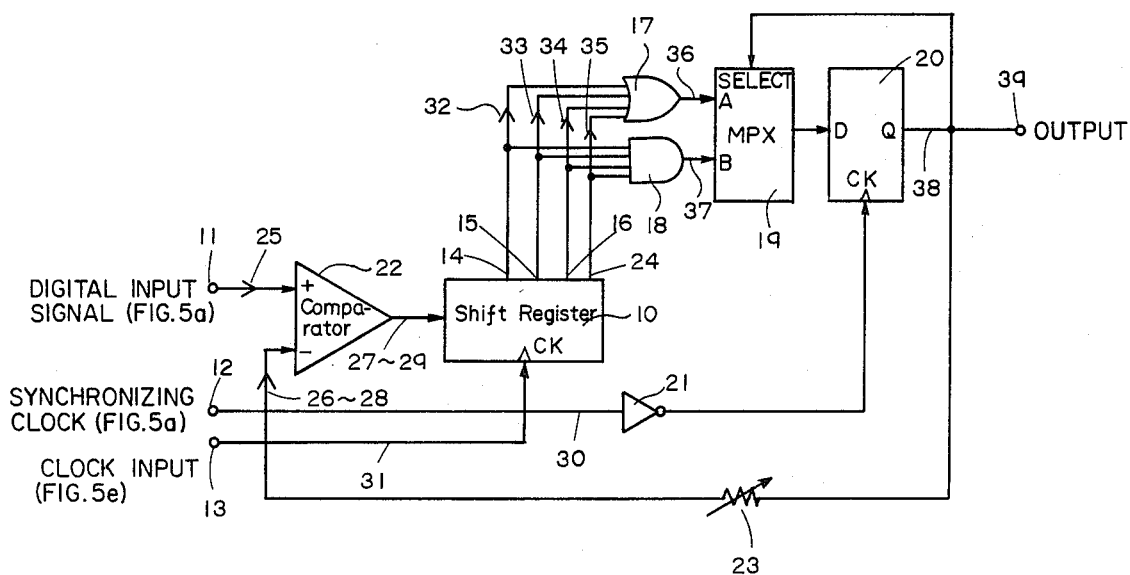

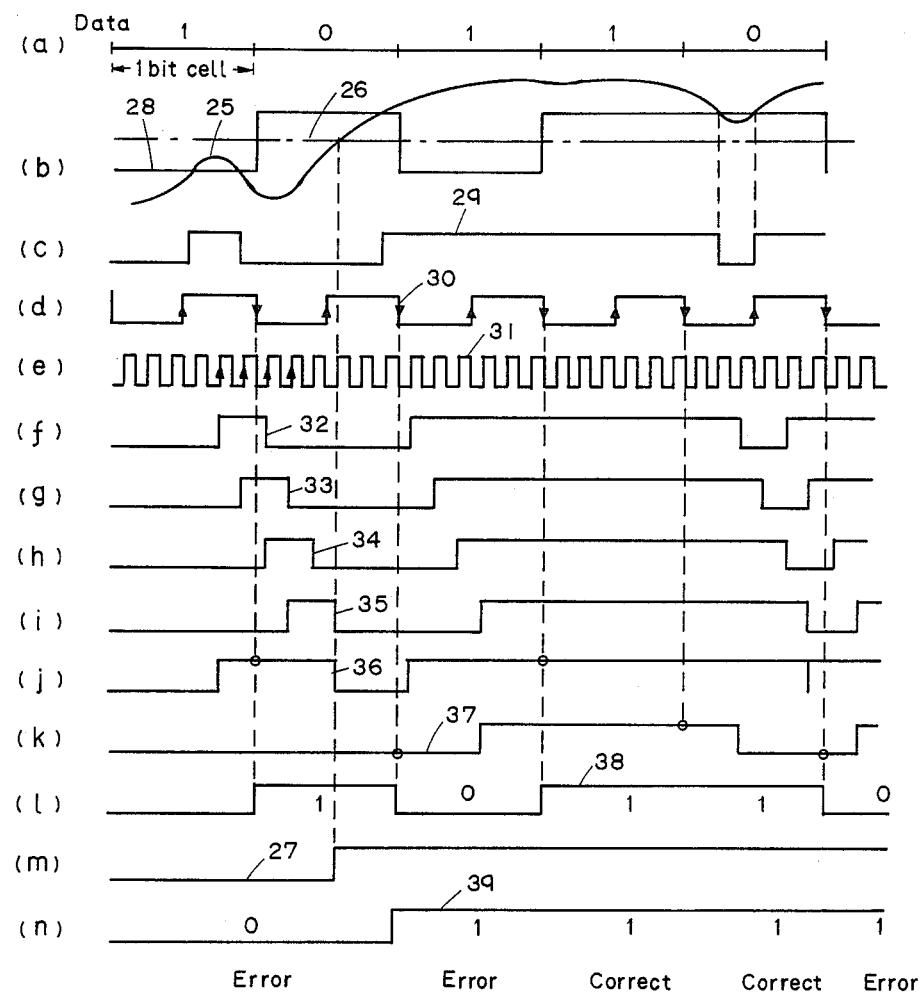

SIGNAL RECONSTRUCTION CIRCUIT FOR DIGITAL SIGNALS

BACKGROUND OF THE INVENTION (1) Field of the Invention

The present invention relates to a digital signal reconstruction circuit which can accurately reconstruct a digital signal recorded on a recording medium such as magnetic tape. More particularly, it relates to a digital signal reconstruction circuit which reads a digital signal recorded on a recording medium at a plurality of sampling points. The logical product or logical sum of the signal samples at the sampling points is selected as the preceding logical data signal of "1" or "0", respectively and is regarded as the content of present-time data.

(2) Description of the Prior Art

Recently, in a PCM (pulse-coder modulation) recorder or the like, a high density digital signal is recorded and played back. With such high-density recording, when the frequency band of the recording and playback system, including the magnetic tape, magnetic heads, etc. cannot be sufficiently widened, the quality of the playback signal is degraded. The degradation is caused by the intersymbol interference between recording bit patterns. As a result it is difficult to extract the digital signal, which difficulty leads to code errors.

In a household PCM encoder/decoder, an audio signal is recorded and played back utilizing a household video cassette system or a part thereof. In such a system, television synchronizing pulses are recorded in a manner such that they appear with original audio signal. As a result the part of the signal occurring immediately after the synchronizing pulse may experience intersymbol interference. Moreover, the recording density of the household video cassette system has become so high in recent years that it is impossible to obtain the necessary frequency bandwidth. This causes an increase in the jitters of the recording and playback systems. It has accordingly become very difficult to precisely extract recorded data.

When demodulating such signal the data have heretofore been extracted at the central positions of the respective bit cells 1 of a recorded waveform as illustrated in FIGS. 1(a), 1(b) and 1(c), wherein the abscissas represents time and the ordinate amplitude. More specifically, when a playback signal 2 as shown in FIG. 1(a) is output from a tape recorder or the like, it is compared with a predetermined threshold level 3 and then wave-shaped by means of a comparator to obtain the wave-shaped output 4 as shown in FIG. 1(b). The wave-shaped output 4 is latched by latch pulses 5 shown in FIG. 1(c). These latch pulses are obtained by frequency dividing and phase adjusting the horizontal synchronizing signal or vertical synchronizing signal interleaved with the data so that they rise at the centers of the bit cells 1 in synchronism with the respective data. With such a method, the signal 2 may be degraded and deformed by the intersymbol interference as illustrated in FIG. 1(d). More specifically, when the wave-shaped output 4 is latched by the latch signal 5 (FIG. 1(f)), erroneous data is extracted as shown at 4a in FIG. 1(e). When the data have been recorded in a high-density recording mode with the household video cassette system, the peak position of the playback data becomes low at points at which the recording wavelength is small relative to the frequency band of the recording system. For example, the digital signal bits forming the playback signal occurring immediately after synchronizing pulses undergo the intersymbol interference and degradation shown in FIG. 1(d). Likewise, a "0" signal bit appearing between signal bits of successive "1's" or conversely a "1" signal bit appearing between signal bits of successive "0's" may undergo intersymbol interference and degradation.

Accordingly, in PCM recording and playback of, e.g., the audio signal with the household video cassette system, it has been necessary to correct the data which are longer or shorter than one bit cell or have been positionally shifted on account of intersymbol interference. This correction has not been easy.

BRIEF SUMMARY OF THE INVENTION

The present invention overcomes the disadvantage mentioned above. It is an object of the invention to provide a digital signal reconstruction circuit which can accurately reconstruct a recorded digital signal using a simple circuit arrangement.

Another object of the present invention is to provide a digital signal reconstruction circuit in which, to accurately read out a digital signal recorded on a recording medium, the logical product or logical sum of the logic levels of the digital signal at a plurality of sampling points determines the preceding data to be "1" or "0", respectively and is regarded as the value of the present-time data.

Still another object of the invention is to provide a digital signal reconstruction circuit in which, in order to accurately read out a digital signal recorded on a recording medium, read-out means are changed depending upon the contents of the preceding (past) data.

The present invention is characterized in that the data contained in a plurality of bit cells are extracted, and when the extracted data include data different from the preceding date, this data different from the preceding data is regarded as correct data, whereas when data is the same as the preceding data, this preceding data is regarded as the correct data.

The above-mentioned and other objects and features of the present invention will become more apparent from the following detailed description taken in conjunction with the accompanying drawings.

BRIEF DESCRIPTION OF THE DRAWINGS

FIGS. 1(a) to 1(c) are waveform diagrams for explaining the normal playback waveform of digital data recorded on a recording medium in the prior art and the read-out waveform thereof, while FIGS. 1(d) to 1(f) are waveform diagrams for explaining the abnormal playback waveform of the digital data in the prior art and the read-out waveform thereof;

FIGS. 3(a) to 3(j) are waveform diagrams for explaining the operation of the embodiment in FIG. 2;

FIG. 4 is a block diagram showing another embodiment of the digital signal reconstruction circuit according to the present invention; and FIGS. 5(a) to 5(n) are waveform diagrams for explaining the operation of the embodiment in FIG. 4.

DETAILED DESCRIPTION OF THE INVENTION

Figure 1:
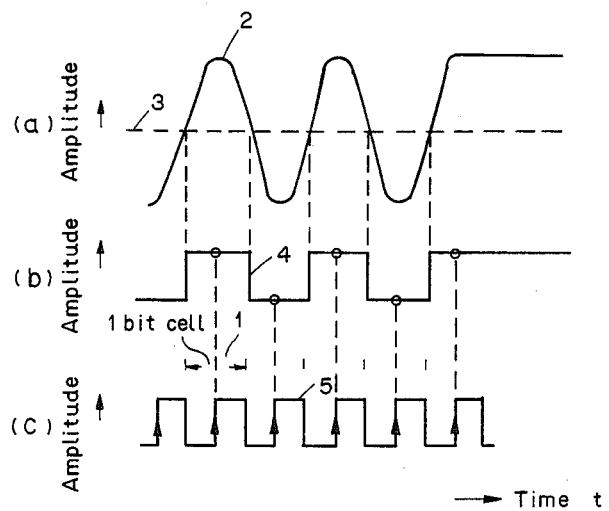
Figure 1:
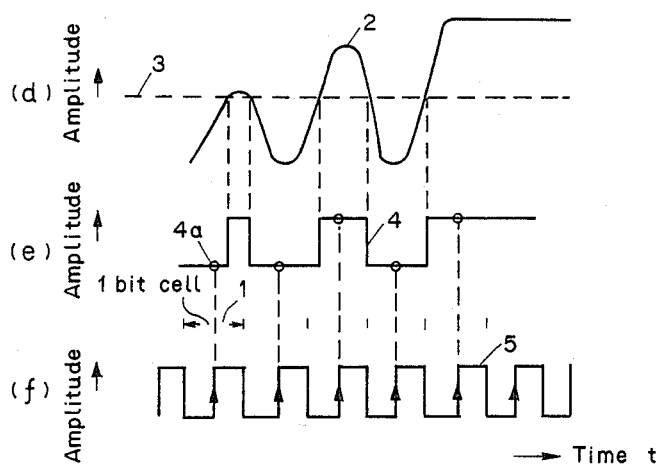
Figure 2:
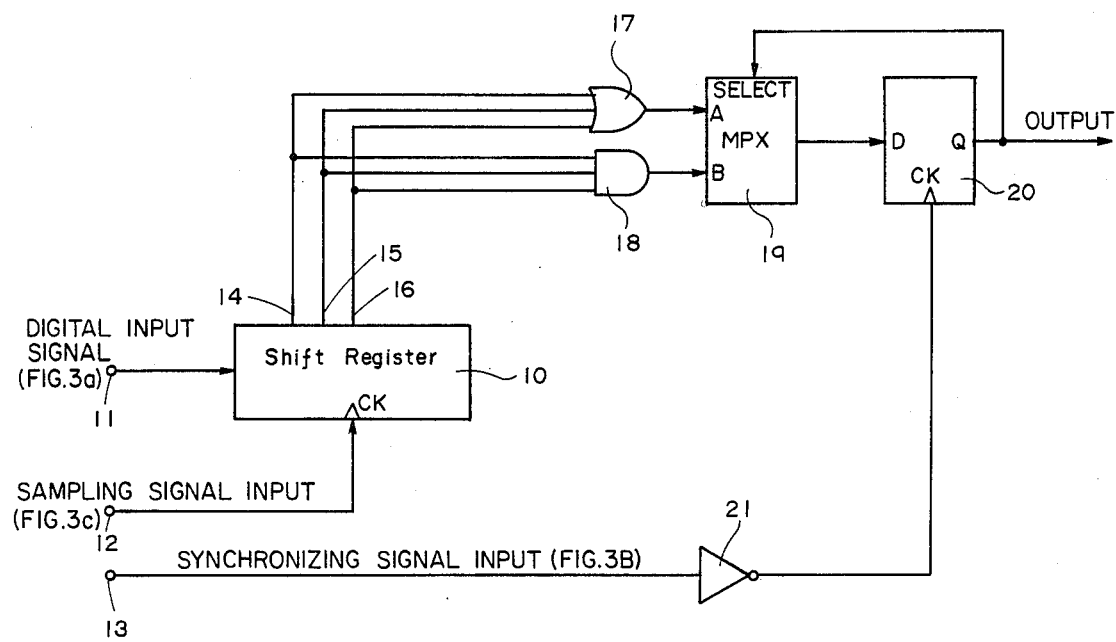
FIG. 2 is a block diagram showing an embodiment of a digital signal reconstruction circuit according to the present invention.

An embodiment of a digital signal reconstruction circuit according to the present invention will now be described in detail with reference to the block diagram shown in FIG. 2 and waveform diagrams shown in FIGS. 3(a) to 3(j). In FIG. 2, numeral 10 designates a shift register. An input terminal 11 is supplied with an input signal (FIG. 3(a)) obtained by reproducing a digital signal from a magnetic tape or the like and then wave-shaping it. The clock terminal CK of the shift register 10 is supplied from an input terminal 12 with a sampling signal (FIG. 3(c)) obtained by frequency multiplying a TV synchronizing signal. The sampling signal may have a frequency 6 times as high as the frequency of the synchronizing signal (FIG. 3(b)) and be synchronous with the bit cells of the input signal. In this way, the shift register 10 shifts the input signal shown in FIG. 3(a). The outputs of the shift register 10 corresponding to, for example, the second, third and fourth clock pulses within each bit cell are respectively derived from the output terminals 14, 15 and 16 of the shift register. The waveforms of these outputs are shown in FIGS. 3(d), 3(e) and 3(f), respectively. The outputs of terminals 14, 15 and 16 are applied to a 3-input OR circuit 17 and a 3-input AND circuit 18 so as to obtain the waveforms of their logical sum (FIG. 3(g)) and their logical product (FIG. 3(h)), respectively. The outputs of the OR circuit 17 and the AND circuit 18 are respectively applied to the input A and the input B of a multiplexer 19. An output provided from the multiplexer 19 is applied to the input D of a flip-flop circuit 20, the clock terminal CK of which is supplied with a clock from an inverter circuit 21. The inverter circuit 21 is connected to an input terminal 13, which is supplied with the signal of FIG. 3(b) obtained by phase shifting a television synchronizing signal to produce a synchronizing signal synchronous with the respective bit cells of the data. The synchronous signal from the input terminal 13 is inverted by the inverter circuit 21, and the rising edge of each pulse of the inverted signal is used for latching the signal applied to the input D of the flip-flop circuit 20. Thus, the signal (FIG. 3(i)) latched in the flip-flop circuit 20 has a delay of 1 bit with respect to the orginal input signal. When the data in the immediately preceding bit cell viewed at the output of flip-flop 20 (FIG. 3(i)) is "1", the multiplexer 19 selects the signal at the input B, and when that data is "0", the multiplexer 19 selects the signal at the input A. Therefore, when the preceding data is "1", the logical product of the logic levels at the data signal at the plurality of sampling points is regarded as the content of the present-time data, and when the preceding data is "0", the logical sum of the logic levels at the data signal at the plurality of sampling points is regarded as the content of the present time data. The input signal obtained by wave-shaping the reproduced digital signal may have a bit pattern "1, 0, 1, 0, 1, 1, 0 ..." as shown in FIG. 3(a). As shown in the FIG. 3(a), a waveform of the first bit "1" does not keep the level "1" during one period of the clock signal shown in FIG. 3(b) due to intersymbol interference and only the latter half cycle of the first bit signal is in the level "1" state. As to the seventh bit "0", the entire cycle should be atthe "0" level, but the first half cycle of the seventh bit is in the "1" state due to the interference of the "1" level of the previous cycle. Only the second half cycle of the seventh bit is correctly at the "0" level. If such input signal is latched on the rise of the clock signal (FIG. 3b) as is required according to the teachings of the prior art, the first bit "1" logical state is not latched but instead thereof the logic "0" is set, and the seventh bit "0" logical state is not latched but instead thereof the logic "1" is set as shown in FIG. 3(j), thereby causing an error. The present invention calls for a shift clock whose frequency is six times the clock shown in FIG. 3(b). The shift register 10 shifts the input signal of FIG. 3(a), thereby preforming a sampling operation at a plurality of points. FIG. 3(d) shows a signal produced by shifting the input signal (FIG. 3(a)) by two cycles of the high frequency clocks (FIG. 3(c)), FIG. 3(e) shows a signal produced by shifting the FIG. 3(a) input signal by three cycles of the FIG. 3(c) clocks, and FIG. 3(f) shows a signal produced by shifting the FIG. 3(a) input signal by four cycles of FIG. 3(c) clocks.

If the first bit of the input signal (FIG. 3(a)) is shifted by the first falling edge of the FIG. 3(b) clock, FIGS. 3(d) and (e) show a correct logic "1" but FIG. 3(f) produces an error logic "0". Even in such a case, however, the signals represented by FIGS. 3(d), (e) and (f) are processed by the OR circuit 17, producing a signal shown in FIG. 3(g) having a wider logic "1" level. Accordingly, at the first falling edge of the FIG. 3(b) clock, the FIG. 3(g) signal definitely represents the correct logic "1" state, which is latched by the latch circuit 20, producing the correct logic "1" as shown in FIG. 3(i). Thus, when the preceding data is at the "0" level, the multiplexer selects the output from the OR circuit 17. Likewise, as to the seventh bit of the input signal (FIG. 3a) the correct "0" state is accurately latched in the latch circuit 20 by having the multiplexer select the AND circuit 18 as the preceding data is in the logic "1" state.

When sequential "1" data exist as shown in the fifth bit (logic "1") and the sixth bit (logic "1") of the FIG. 3(a) signal, it is clear that the sixth bit (logic "1") is correctly set in the latch circuit 20. That is, as the preceding fifth bit is the logic "1", the multiplexer 19 selects the AND circuit 18, all of the signals of FIGS. 3(d), (e) and (f) produced by shifting the sixth bit by the high frequency clocks of FIG. 3(c) represent the logic "1" at the falling edge of the clock signal (FIG. 3b), thus producing the logic "1" at the output of the AND circuit 18, which is correctly set in the latch circuit 20. Likewise, when the sequential "0" data exist, the preceding data is in the "0" level, producing all of the FIGS. 3(d), (e), (f) signals in the "0" logic, resulting in the "0" output from the OR circuit, which is correctly set in the latch circuit 20. Accordingly, even when the input signal has been degraded, the digital data can be accurately reconstructed. Moreover, the circuit arrangement for the reconstruction is very simple.

By the way, in the case where the input signal shown in FIG. 3(a) is latched and extracted by the rising edges of the pulses of the synchronizing signal (FIG. 3(b)) as in the prior-art, the data are erroneously demodulated as shown in FIG. 3(j).

In the above embodiment, the data are sampled at 6 points by the 6-bit shift register 10, and their contents are determined from the data corresponding to the second, third and fourth clock pulses located centrally, these points affording comparatively precise data. Therefore, a more accurate reconstruction can be effected. Needless to say, the number of sampling points of data is not restricted to 6 and other numbers of sampling points can be selected. Further, in the above embodiment, the plurality of sampling points are obtained by shifting the data in time sequence. Of course, however, the contents of data may well be decided from a plurality of points of data loaded at the same time.

FIG. 4 shows another embodiment of the present invention. The same parts as in FIG. 2 are assigned the same symbols and will not be explained further. A signal to be played back is applied from an input terminal 11 to the plus input terminal of a voltage comparator 22, the minus input terminal of which is supplied with the threshold voltage supplied by the Q output of a flip-flop circuit 20 through level adjustment means 23, such as a varible resistor. Further, since data are extracted at the four points of the second to fifth outputs 14, 15, 16 and 24 from a shift register 10, each of the OR circuit 17 and the AND circuit 18 has 4 inputs. Operations in the case of such arrangement will now be described in detail by referring to the waveform diagrams in FIGS. 5(a) to 5(n).

As shown in FIG. 5(a), a digital data signal of, e.g., "1, 0, 1, 1, 0", is recorded on a recording medium in single bit cell units. When the data signal is read out, it is reproduced into a waveform which has been severely degraded by the waveform interference as indicated at numeral 25 in FIG. 5(b). The reproduced waveform is applied to the input terminal 11. If the threshold level of the voltage comparator 22 is fixed to, e.g., a value indicated at numeral 26 in FIG. 5(b), the output waveform of the voltage comparator 22 will be as shown by waveform 27 in FIG. 5(m). In this embodiment of the present invention, however, the threshold level can change from the position 26 to the position 28 shown in FIG. 5(b) as will be described later. Therefore, the output waveform of the voltage comparator 22 appears as waveform 29 shown in FIG. 5(c). The clock 31 (FIG. 5(e)) for the shift register 10 is impressed on an input terminal 13. It has a frequency which is an integral multiple (6 times in FIG. 5(e)) higher than that of a synchronizing clock 30 (FIG. 5(d)) synchronous with the data of FIG. 5(a). Shifted signals 32, 33, 34 and 35, which have been shifted by 2 bits, 3 bits, 4 bits and 5 bits as shown in FIGS. 5(f), 5(g), 5(h) and 5(i), are respectively provided from the output terminals 14, 15, 16 and 24 of the shift register 10 and applied to both the OR circuit 17 and the AND circuit 18. The OR circuit 17 provides a logical sum waveform 36 shown in FIG. 5(j), while the AND circuit 18 provides a logical product waveform 37 shown in FIG. 5(k). These output waveforms are respectively applied to the terminals A and B of a multiplexer 19. The inputs of the multiplexer 19 are distributed depending upon the data in the preceding bit position. That is, when the preceding data is "0", the logical sum 36 is selected, and when it is "1", the logical product 37 is selected. The signal thus selected is latched by the latch circuit constructed of the flip-flop circuit 20, in synchronism with the rising edges of pulses obtained by inverting, in inverter 21, the synchronizing clock 30 of FIG. 5(d) impressed on an input terminal 12. Then, the correct waveform 38, shown in FIG. 5(l), is derived from flip-flop 20. This output 38 is fed back to the multiplexer 19.

In addition, the preceding data, i.e., the signal delayed by one bit cell interval by the flip-flop 20, determines the threshold level of the voltage comparator 22, thereby accurately detecting whether the present data is "1" or "0". Namely, when the preceding data is the logic "1", the threshold level is raised at the next clock time, thereby causing the next "0" level to be accurately detected by using the raised logic "1" threshold level at the comparator 22. It is adjusted to the optimum level by the level adjuster 23 so as to, e.g., lower the threshold level of the voltage comparator 22 from the value 26 to the value 28, whereby the next data can be correctly read.

When the distorted playback waveform 25 shown in FIG. 5(b) is reconstructed by the circuit shown in FIG. 2, the playback waveform having the reduced amplitude cannot be detected because the threshold level of the voltage comparator 22 is held constant at the value 26. Therefore, the output waveform of the voltage comparator 22 becomes the waveform 27 in FIG. 5(m). When this waveform 27 is latched by the use of the synchronizing clock 30 in FIG. 5(d), a waveform 39 in FIG. 5(n) is produced. This waveform 39 involves erroneous data in three bits when compared with the correct data of FIG. 5(a) recorded on the recording medium.

While, in the above embodiment, the values of the logical sum and the logical product are distributively allotted depending upon the preceding data, a circuit arrangement suffices wherein when the preceding data is "0", the present-time data is deemed "1" subject to the existence of "1" in a plurality of points though in a single bit and is deemed "0" otherwise, whereas when the preceding data is "1", the present-time data is deemed "0" subject to the existence of "0" in the plurality of points though in a single bit and is deemed "1" otherwise.

Further, in the above embodiment, when at least one of the contents of the four sampling points differs from the preceding data, the different data is used as the present-time data. In this regard, however, it is also allowed to set eight sampling points and to regard different data as the present-time data upon condition that at least two of the eight data are different, or to set nine sampling points and to decide the present-time data upon condition that, e.g., at least three or at least two of them are different.

The embodiment of FIGS. 4 and 5(a)–5(n) brings forth the beneficial result that even a severely degraded signal whose peak position has collapsed or whose amplitude has become insufficient on account of the waveform interference can be precisely reconstructed by the comparatively simple circuit arrangement.

I claim:
1. A digital signal reconstruction circuit comprising means for reproducing a digital signal recorded on a recording medium by sampling the digital signal at a plurality of points and when a sampled digital signal differs in content from a preceding sample of the digital signal at any of the plurality of points, the different signal is regarded as correct data and thus reproduced, while when such a different signal does not exist at any of the plurality of points, the same signal as the preceding signal is regarded as being correct data and thus reproduced.

2. The digital signal reconstruction circuit according to the claim 1 comprising reproduction means for reading out a digital data signal recorded on a recording medium, signal derivation means for deriving a plurality of shifted signals produced by shifting digital data provided from said reproduction means, arithmetic means for processing the outputs of said signal derivation means and for providing two outputs, selection means for selecting one of the outputs of said arithmetic means, and a latch means, producing a delay for receiving the output signal of said selection means and for producing said preceding signal to control the selection means.

3. The digital signal reconstruction circuit according to the claim 2 wherein said arithmetic means comprises a logical sum circuit and a logical product circuit to which said plurality of shifted signals obtained from said signal derivation means are supplied in a parallel manner and either one of said logical sum circuit and said logical product circuit is selected in accordance with the preceding signal appearing in the output of said latch means.

4. The digital signal reconstruction circuit according to the claim 3, wherein the logical product circuit is selected when the preceding signal is a logic "1" and the logical sum circuit is selected when the preceding signal is a logic "0".

5. The circuit according to the claim 2, wherein said signal derivation means comprises a shift register.

6. A digital signal reconstruction circuit as claimed in claim 2, further including voltage comparison means connected to said signal derivation means, one input of said voltage comparison means being supplied with the output of said reproduction means and the other input is connected to receive an output from said latch means, to thereby vary the threshold level of said voltage comparison means.

7. A digital signal reconstruction circuit as claimed in claim 6, further including level adjustment means connected between said other input of said voltage comparison means and the output from said latch means.

* * * * *